(12) United States Patent
Ekin

(10) Patent No.: US 10,002,476 B1
(45) Date of Patent: Jun. 19, 2018

(54) SMART BARRIER SYSTEM

(71) Applicant: EKiN TEKNOLOJi SANAYi VE TiCARET ANONiM ŞiRKETi, Istanbul (TR)

(72) Inventor: Akif Ekin, Istanbul (TR)

(73) Assignee: EKIN TEKNOLOJI SANAYI VE TICARET ANONIM SIRKETI, Istanbul (TR)

( * ) Notice: Subject to any disclaimer, the term of this patent is extended or adjusted under 35 U.S.C. 154(b) by 0 days. days.

(21) Appl. No.: 15/869,103

(22) Filed: Jan. 12, 2018

(30) Foreign Application Priority Data

Feb. 27, 2017 (TR) .................................. 2017/03006

(51) Int. Cl.
| | | |
|---|---|---|
| *G08B 13/00* | (2006.01) | |
| *G07C 9/00* | (2006.01) | |
| *G08B 13/08* | (2006.01) | |
| *G06K 9/00* | (2006.01) | |
| *G06K 9/32* | (2006.01) | |
| *G08B 13/196* | (2006.01) | |
| *H04M 1/725* | (2006.01) | |

(52) U.S. Cl.
CPC ..... *G07C 9/00079* (2013.01); *G06K 9/00255* (2013.01); *G06K 9/00288* (2013.01); *G06K 9/3258* (2013.01); *G08B 13/08* (2013.01); *G06K 2209/15* (2013.01); *G08B 13/1966* (2013.01); *H04M 1/72561* (2013.01)

(58) Field of Classification Search
CPC .................................. H04N 1/00; G08B 1/00
See application file for complete search history.

(56) References Cited

U.S. PATENT DOCUMENTS

2004/0143602 A1* 7/2004 Ruiz .................... G08B 13/122
2017/0320400 A1* 11/2017 Redmann ............ B60L 11/1816

* cited by examiner

*Primary Examiner* — Shirley Lu
(74) *Attorney, Agent, or Firm* — Gokalp Bayramoglu

(57) ABSTRACT

This disclosure is related to the Smart Barrier System used in vehicle entrance and exit systems that works together with high definition license plate and face recognition systems and web portals through the monitoring sensor positioned on the Barrier, objects, on posts facing the garage entrance, garage door and vehicle access ways and positioned on walls around the vehicle access ways.

13 Claims, 6 Drawing Sheets

SMART BARRIER SYSTEM

CROSS REFERENCE TO RELATED APPLICATIONS

This application is based upon and claims priority to Turkish Patent Application No. 2017/03006, filed on Feb. 27, 2017, the entire contents of which are incorporated herein by reference.

TECHNICAL FIELD

This disclosure relates to Smart Barrier System, especially, relates to the Smart Barrier System used in vehicle entrance and exit systems that blocks and/or allows controlled entrance to places such as housing estates and garage spaces where uncontrolled access is not desired.

BACKGROUND

Nowadays, there are several vehicle entrance and exit applications and systems related to controlling vehicle entrances and exits. These systems not only operate inconsistently but also cause frequent failures. Slow opening and closing Barriers are insecure systems that cause long queues at vehicle entrance and exit ways due to dialogs regarding identification checks with the operator in charge of opening the Barrier. In such systems camera reading success rate is low; they do not have face recognition features and they do not have the capability of being managed over a web page. Their operation and installation procedures take time since their setting up comprises complicated parts.

Present systems do not have a structure that can be set-up easily by plug-and-play and cannot be limitlessly expandable even though they operate on the internet or on a network.

Present systems do not have the brand and model detection and detailed reporting features.

Present systems do not have Event Scenario Definition feature. Moreover, Advanced Alarm Features and Advanced Reporting Features of which the details are provided starting from page 8 are not present in the current systems.

The Smart Barrier System that is developed to overcome the abovementioned disadvantages has a system different from the closest implementations of the known state of the art.

SUMMARY OF THE INVENTION

The Smart Barrier System is a system that controls vehicle entrance and exit where it is installed, that allows access depending on certain authorization scenarios and changes to alarm state at negative and adverse situations, that reports, that is web based manageable and that enables opening and closing of the Barrier depending on the authorization and that comprises a plate reading face recognition feature with high success rate.

The object of the disclosure is to provide a system that enables opening the Barrier in a secure and easy manner.

Another object of the disclosure is to provide a system that is designed to manage entrance and Barrier control in an easier and fast manner.

Another object of the disclosure is to provide a system that can be enabled fast and easily.

The present disclosure is related to the Smart Barrier System to achieve all the objects that are mentioned above and that can become evident from the detailed description provided below.

BRIEF DESCRIPTION OF THE DRAWINGS

Through reading the detailed description of the following embodiments, various other advantages and benefits will become apparent to those of ordinary skills in the art. Accompanying drawings are merely included for the purpose of illustrating the preferred one of embodiments and should not be considered as limiting of the application. Further, throughout the drawings, same elements are indicated by same reference numbers.

Figure 1:
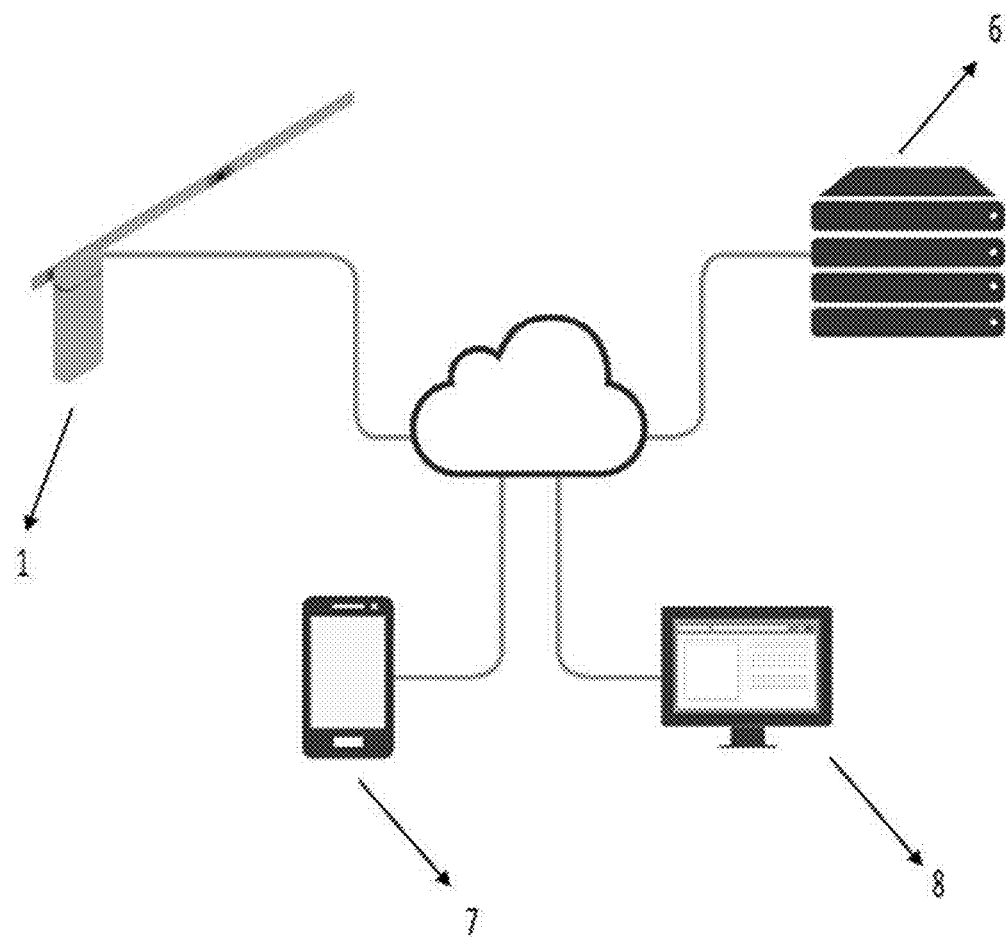
FIG. 1: Shows general working view of the Smart Barrier System of the present disclosure.

The parts/sections/components shown in the figures that are prepared for providing a better understanding of the disclosure entitled Cloud Smart Barrier System developed by this disclosure are individually assigned reference numbers and each of these numbers corresponds to:
1 Barrier
2 License Plate Recognition and Processing Module
3 Monitoring Sensor
4 Communication Module
5 Illumination Module
6 Server Portal Application
7 Mobile Phone Application
8 Web Page
9 Face Recognition Sensor

DETAILED DESCRIPTION OF THE INVENTION

In this detailed description, the Smart Barrier System which is the novelty of the disclosure is described by the non-limiting examples for providing a better understanding of the subject.

The definitions and descriptions of the components forming the Smart Barrier System are given below. The components related to the parts forming the Smart Barrier System are made of industrial materials that are suitable for using in an external environment of at least IP 65 standards and that are resistant to vibration, extreme heat and extreme cold temperatures.

The present disclosure shows the Smart Barrier System used in vehicle entrance and exit systems that blocks and/or allows controlled entrance to places such as housing estates and garage spaces where uncontrolled access is not desired, where said system interoperates with imaging and recognition sensors, high definition license plate and face recognition systems and web portals positioned on mobile and immobile components (hereby said mobile and immobile components are referred to as "Barriers") such as posts looking towards vehicle entrances and walls around the vehicle entrances License Plate Recognition and Processor Module:

It is the module in which license plate recognition operation is performed, where the Barrier is managed and where the processor is located. The functions are plate reading and Barrier control depending on the authorization level.

License Plate Reading:

The module automatically detects and recognizes each vehicle's license plate. It records the image of the vehicle along with the image of the license plate and stores the time and location information.

Barrier Control Depending on Authorization Level:

It finds the plate locations of the approaching vehicles. Reads and recognizes the plates. Depending on the authorization level, it opens or keeps close the Barrier. Manages the Barrier according to the lists received from the Server Portal Application and takes action according to Event Scenario.

The Vehicles in the White List: Reads the plate and opens the Barrier. Takes the image of the vehicle and the plate. Record it along with the time and location information.

The Vehicles in the Black List: It may turn on light, give an audible warning, send a text message to mobile phone, take image of the plate and the vehicle, and record it along with the time and location information according to the Event Scenario performed when a vehicle in the black list is detected.

The Unlisted Vehicles: Sends text message to the mobile phone according to the procedure sequence program. Opens the barrier if authorized. Takes the image of the plate and the vehicle. Records it along with the time and location information. Depending on the event scenario, it may keep the Barrier closed after recording the incoming vehicle or it may open the Barrier after recording the incoming vehicle.

Video Record:

If desired, the system has the capability of continuously take video recording 7/24 and broadcast. Video recording is provided optional. The user can access the records on the field if desired.

It can perform video search according to plate, time, vehicle brand and model, color and location criteria.

Brand and Model Information Recognition:

It can recognize vehicle brand, model and color. Then the user can develop event scenarios for plates that are authorized but where brand, model or color information of the vehicle is not matched. It is provided as brand and model information.

Barrier (1) Garage Entrance, Post, Wall, Object (where the Entrance Control System is Installed):

It is the part that opens and closes the entrance and exit depending on the trigger received from the license plate recognition and Processor module and that can be manually operated if required.

Monitoring Sensor (3):

The monitoring sensor (3) provides image to the License Plate Recognition and Processor Module. The image is used for license plate recognition, vehicle photograph, plate photograph and live video broadcast. The resolution and FPS can be adjusted according to bandwidth and requirement.

Face Recognition Sensor (9):

It is the sensor that enables identification according to facial properties of the people.

Communication Module (4):

The Communication Module (4) supports UTP LAN, WiFi, 3G and 4G communication prototypes. It can send SMS. It provides IP based communication between the Device and the Server Portal Application (6).

Illumination Module (5):

The Illumination Module (5) provides illumination of the vehicle and the plate depending on the need. It uses White Led, IR Led, Red Light, White Light and similar lighting technologies.

Server Portal Application (6):

Server portal application provides Web Service for the Mobile Phone Application (7). It is the application in which all user data is stored, Cloud Smart Barrier Systems in the field are managed, database is stored and authorization is managed. It generates a trigger in situations requiring alarm. It prepares and presents statistics and reporting information and keeps the Logs.

Mobile Phone Application (7):

Mobile Phone Application (7) is an application where the users can monitor and manage the Smart Barrier System. It works in connection with the Cloud infrastructure and Server Portal application (6).

Authorization:

When the Cloud Smart Barrier System (1) detects a vehicle in the black list, detects an unlisted vehicle or detects a brand, model, color not matching with the license plate, it can send SMS, e-mail or directly a warning over the application for user approval depending on the event scenario. The received message can be approved or rejected by checking the image over the mobile phone application (7).

Creating the Lists:

The user defines the unauthorized vehicles in the black list and the authorized vehicles in the white list here on the Mobile Phone Application (7).

Defining the Event Scenarios:

Here, the user programs how the system must react when a vehicle in the Black List, in the White List or Unlisted is detected. As required, a light can be turned on and sound may be triggered, SMS or e-mail may be sent. The Barrier may be kept closed or may be opened.

Monitoring the Logs:

The user can monitor system inputs, how the system reacts against which event, error and failure logs. Here, the user defines the authorized vehicles, the vehicles in the black list and the event scenarios. Previously read license plates can be seen and searched. The system logs can be seen. It records all entrance and exit events along with license plate, time and location information. It records all authorization inputs and by whom along with the user name and access. The user can access this information whenever and wherever needed.

Search Function:

The user can perform a search with time and plate, alarm type and location. Search results are presented to the user with small thumbnail images. The user can see plate image and vehicle image and can watch the video. Live video broadcast and recording is provided optional.

Advanced Smart Alarm Features:

The alarm comprises features such as:
  Transmitting information and alarms received from the Cloud infrastructure to the user,
  Providing customizable authorization levels for Guest Vehicles, Service Vehicles and Other Authorized Vehicles, giving a warning in case of staying longer than a pre-defined period and when more than defined number of vehicles enter, and recording said vehicles
  Detecting service and guest vehicles entering outside of normal hours,
  Enabling the alarm feature if the read license plate does not match the brand and model of the recorded plate,
  Having alarm feature for twin license plates, Having recording and warning features if there is entrance or exit outside the defined entrance and exit hours of the user to provide information about stolen or unauthorized vehicle use.

Live Video Watching, Remote Record Watching:

Live video broadcast can be done from the region where the barrier is located. It can store on internal storage. This feature can be optionally used.

The user can remotely connect and watch live video. The license plate reading works integrated with the video recording. Video images of the read and alarm triggering license plates can be accessed depending on the search results.

Web Page (8):

It is the web page application where the users can monitor and manage the Cloud Smart Barrier System. It works in connection with the Cloud infrastructure and server portal application (6). It has similar functions with the Mobile phone application (7) and additionally it provides advanced reporting features. It has functions such as authorization, creating lists, defining event scenarios, monitoring logs, search function, advanced smart alarm, advanced reporting, ready infrastructure and software for housing complex security management system integration, live video watching and remote record watching.

Authorization:

When the Smart Barrier System detects a black listed vehicle, an unlisted vehicle or a vehicle of which the license plate does not match the brand, model and color, it can send a warning for user approval depending on the event scenario. The received warning can be approved or rejected by checking the image.

The user defines the unauthorized vehicles in the black list and the authorized vehicles in the white list here in the web page (8).

Defining Event Scenarios:

Here, the user programs how the system must react when detecting a black listed, white listed or unlisted vehicle. As required, a light can be turned on and sound may be triggered, SMS or e-mail may be sent. The Barrier may be kept closed or may be opened.

Monitoring Logs:

The user can monitor system inputs, how the system reacts against which event, error and failure logs. Thus, it provides the possibility for seeing the previously read license plates and system logs and performing search. It records all entrance and exit events along with license plate, time and location information. It records all authorization inputs and by whom along with the user name and access.

Search Function:

The user can perform a search with time and license plate, alarm type and location. Search results are presented to the user with small thumbnail images. The user can see plate image and vehicle image and can watch the video. Live video broadcast and recording is provided optional.

Advanced Smart Alarm Features:

The alarm comprises features such as:
Transmitting information and alarms received from the Cloud infrastructure to the user,
Providing customizable authorization levels for Guest Vehicles, Service Vehicles and Other Authorized Vehicles, giving a warning in case of staying longer than a pre-defined period and when more than defined number of vehicles enter, and recording said vehicles
Detecting service and guest vehicles entering outside of normal hours,
Enabling the alarm feature if the read license plate does not match the brand and model of the recorded plate,
Having alarm feature for twin license plates,
Having recording and warning features if there is entrance or exit outside the defined entrance and exit hours of the user to provide information about stolen or unauthorized vehicle use.

Advanced Reporting Features:

If used in housing complexes, it provides information related to determining the improvement and requirements of the housing,
It reports number and type of entering vehicles,
It reports difference, increment and decrement in numbers with respect to hours, days, weeks and months,
It reports analytics and tracking of entrance numbers depending on the authorization type.

Ready to Use Infrastructure and Software Features for Housing Complex Management System Integration:

It allows manual intervention for housing security staff; however, it records all user operations with user name. It can send physical or software based alarm trigger for housing complex camera system.

Live Video Watching, Remote Record Watching:

It enables live video broadcast from the region where the barrier is located and storing on internal storage.

The user can remotely connect and watch live video. The license plate reading works integrated with the video recording. Video images of the read and alarm triggering license plates can be accessed depending on the search results. Live video watching and remote record watching are provided optional.

The system is designed to manage entrance and Barrier (1) control easier and faster. System works with web portal for high performance license plate recognition system and management without requiring operator intervention. When authorized vehicle approaches, its license plate is read and Barrier (1) is automatically opened according to its authorization level.

The system is enabled as follows; the application is downloaded to the mobile phone by the QR code on it and activated by the provided activation code. The user immediately starts programming the device. The authorized license plates are added to the white list. The system logs the white listed license plates and opens the Barrier.

The Event Scenario can be programmed for when the system encounters an unlisted license plate. When encounters an unlisted license plate, the system may log and open the Barrier or it may send e-mail or message to the owner of the system for approval. The approval operation can be easily done by SMS, e-mail or over the application.

Event Scenario: The programmed procedural steps will be followed by the system after an event happens. One or several of the SMS sending, warning signal sending, warning light, sound warning etc. operations can be done in combination. As all Barriers belonging to a housing estate can be associated with only one house, the user may monitor and manage more than one housing from one center by grouping.

The system differs from the other competition on the market by its easy and fast implementation feature. It can be implemented in half a day by ready anchorage.

Referring to FIG. 1, it is shown that the Smart Barrier System has a structure in which communication is established between the Barrier (1), Server Portal Application (6), Mobile Phone Application (7) and Web page (8).

Figure 2:
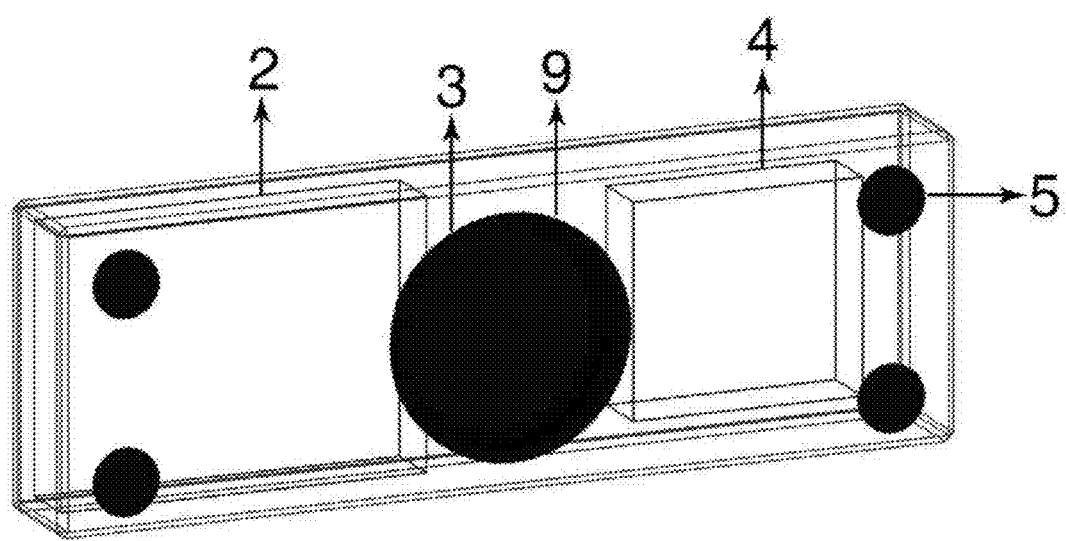
FIG. 2: Shows the position of the monitoring sensor used in the Smart Barrier System of the present disclosure.

Referring to FIG. 2, Smart Barrier System, in which, the location of the monitoring sensor (3) that enables reading the license plate while the vehicle is coming is shown. Moreover, by the lights next to the monitoring sensor (3), a sharper image can be obtained.

The implementation procedure comprises the steps of;
Installation,
Inserting SIM card to the device,
Making electrical connections,
Downloading the program to the phone by reading the QR code on the device,
Adding the Barrier (1) and Barriers to the management system by device serial number and activation code,
Starting programming the authorized vehicle license plates and alarm policies over the mobile phone application (7) by the user.

The Smart Barrier System of which the details are provided above, that works together with high performance license plate recognition, face recognition system and web portal for management is characterized by;

The Barrier (1) that enables opening and closing the entrance and exit depending on the trigger received from the license plate, face recognition and Processor module (2), that can also be manually used and where the system is installed, The processor module (2) where the license plate and face recognition operations are performed and where the Barrier is managed, The Monitoring Sensor (3) that is used for license plate, face recognition, vehicle image, license plate image and live video broadcasting, of which the resolution and FPS (Frames Per Second) are adjusted depending on the bandwidth and requirement, that provides image to the plate recognition and processor module (2), The Communication Module (4) that supports UTP LAN, WiFi, 3G and 4G communication protocols, that sends SMS, that provides IP based communication between the Device and Server Portal Application, Illumination module (5) that enables illuminating the vehicles and license plates by using lighting technologies, The Server Portal Application (6) that provides Web Service for the mobile phone application, in which all user data is stored, where the Cloud Smart Barrier Systems in the field are managed, in which the database is located and where the authorization is managed, The Mobile Phone Application (7) where the users can monitor and manage the Smart Barrier System, The web page where the users can monitor and manage the Smart Barrier System, The face recognition sensor (9) that enables identification depending on the facial properties of the people.

Figure 3:
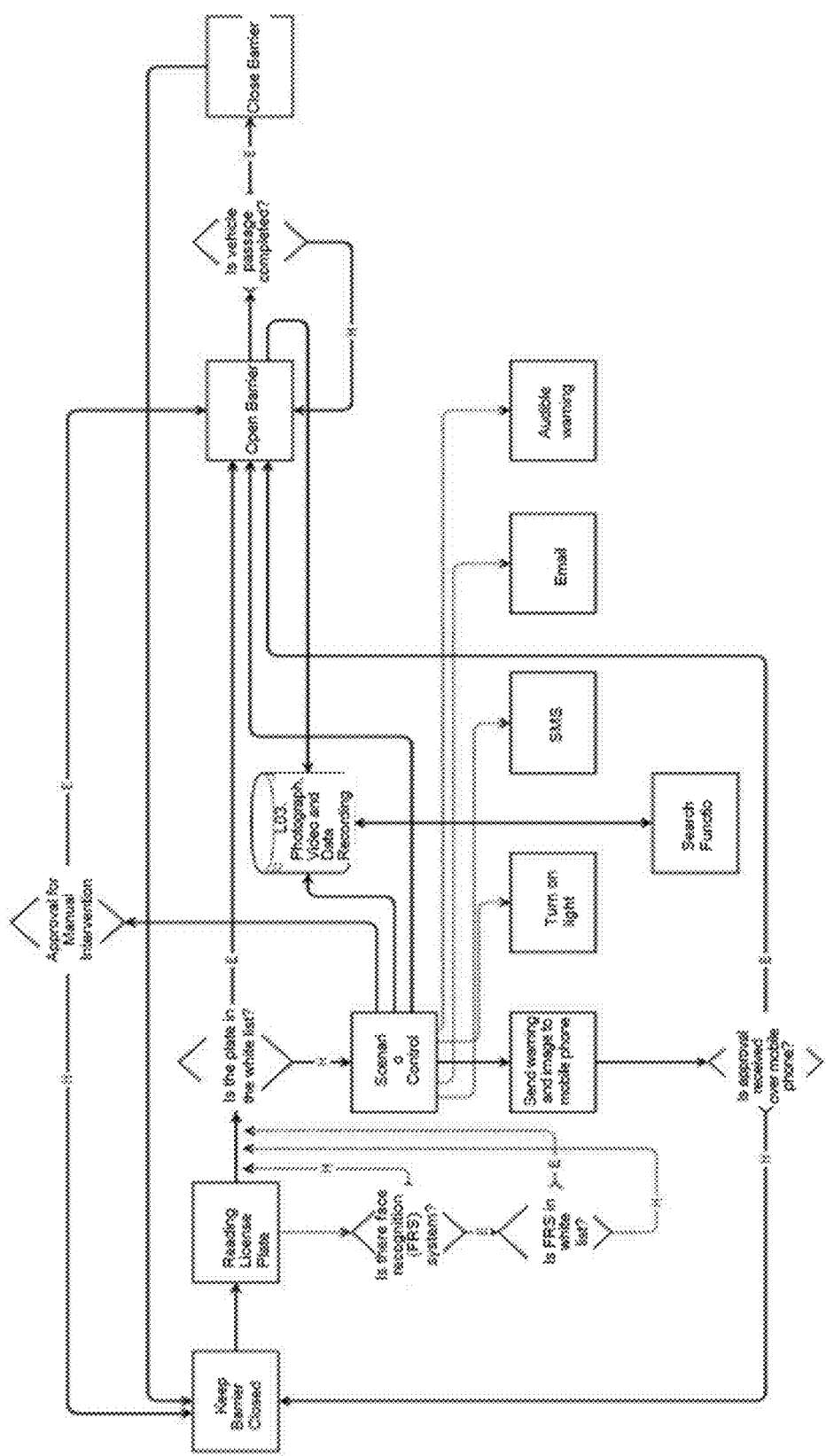
FIG. 3: Shows the flow chart of the Smart Barrier System of the present disclosure.
Figure 4:
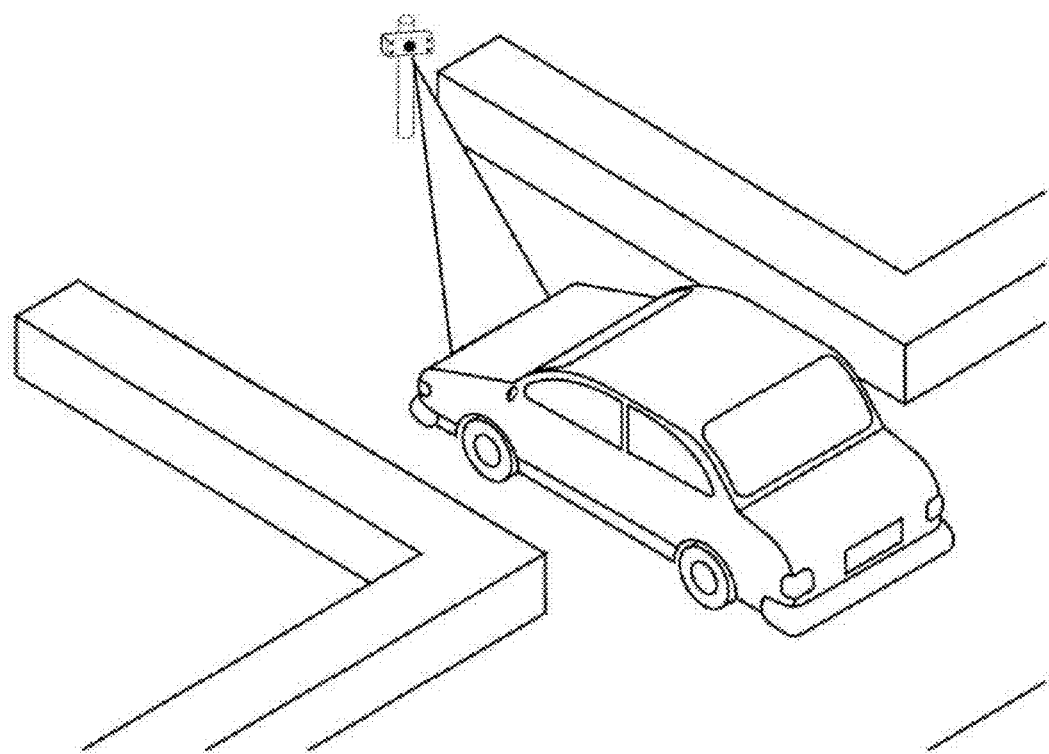
FIG. 4: Shows the Smart Barrier System as positioned on a post of the present disclosure.
Figure 5:
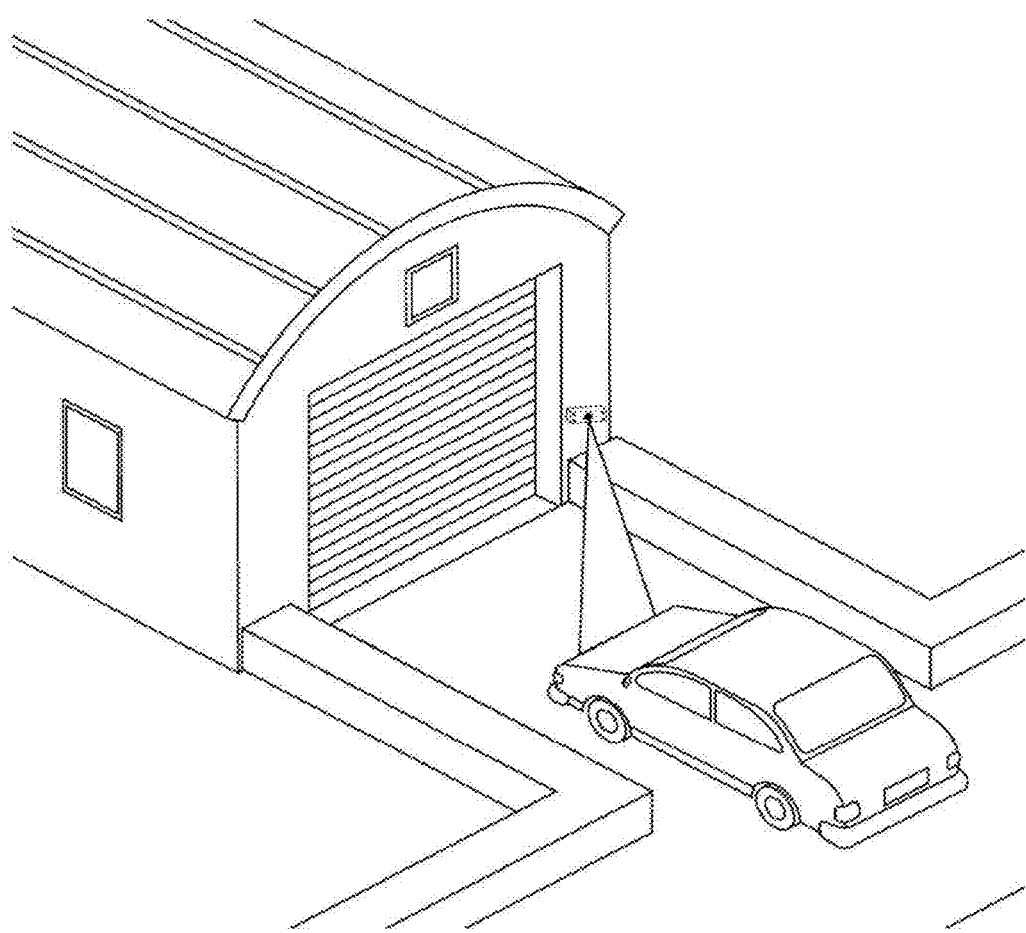
FIG. 5: Shows the Smart Barrier System as positioned on a wall for garage entrance of the present disclosure.
Figure 6:
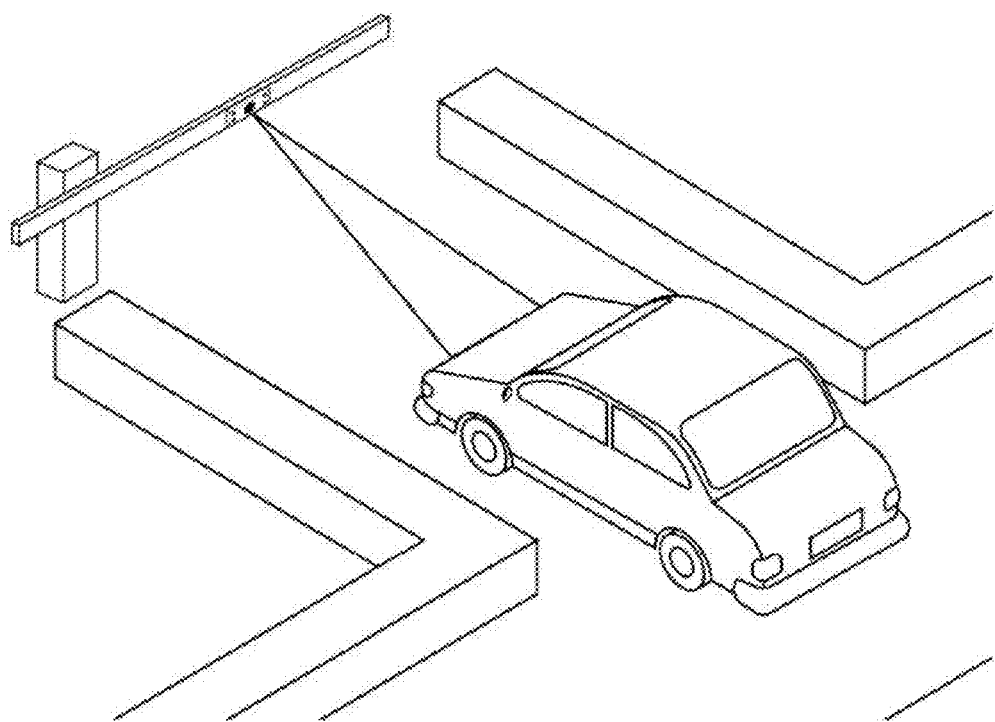
FIG. 6: Shows the system positioned on the barrier of the present disclosure.

Referring to FIG. 3, the flow chart of the Smart Barrier System is shown. The description of the flow chart related to operation of the Smart Barrier is as follows.

Working principle of the said Smart Barrier System characterized by comprising the steps of;
Keeping the Barrier (1)/item, gate, door closed,
Reading the license plate of the incoming vehicle,
Commencing Face Recognition System (FRS) control procedures if there is a FRS,
Checking if the recognized face is in the white list and proceeding to check if the license plate is in the white list,
Check if the read license plate is in the white list or not,
Opening the Barrier if the license plate is in the white list,
Checking if the passage of the vehicle is completed after the Barrier is opened,
Keeping the Barrier (1) open if passage of the vehicle is not completed,
Closing the Barrier (1) if vehicle passage is completed and getting ready for reading a new vehicle license plate,
If the license plate is not in the white list, turning on the light, sending SMS, sending e-mail and giving vocal alarm and sending to approval for manual intervention,
If the license plate is not in the White List, sending warning and image to the mobile phone,
Receiving approval from the mobile phone,
When an approval is not received from the mobile phone; keeping the Barrier (1) closed and reading the license plate,
Opening the Barrier when approval is received from the mobile phone,
Opening the Barrier and logging if approval is received by manual intervention,
If not approved by manual intervention, keeping the Barrier closed,
Recording the log, photograph, video and data and running the search function.

The invention claimed is:

1. A smart barrier system that interoperates with a license plate recognition system, a face recognition system and a web portal for management, comprising:
a processor module, where a license plate recognition operation of the license plate system and a face recognition operation of the face recognition system are performed and where the barrier is managed,
the barrier that enables opening and closing an entrance and exit depends on a trigger received from the processor module, the barrier can also be manually used, and the smart barrier system is installed on the barrier;
a monitoring sensor is configured to broadcast a license plate, a face recognition, a vehicle image, a license plate image and a live video, a resolution and FPS (Frames Per Second) of the monitoring sensor are adjusted depending on a bandwidth and a requirement for providing images to the processor module;
an illumination module is configured to illuminate the vehicle and license plate by using lighting technologies;
a server portal application is configured to provide a web service for a mobile phone application, user data is stored in the server portal application, a cloud smart barrier system in the field is managed in the server portal application, a database is located in the server portal application and an authorization is managed in the server portal application;
the mobile phone application enables user to monitor and manage the smart barrier system;
a communication module is configured to support UTP LAN, WiFi, 3G and 4G communication protocols and send SMS that provides an IP based communication between a device and the server portal application;
a web page enables the user to monitor and manage the smart barrier system,
a face recognition sensor is configured to enable an identification depending on facial characteristics of people.

2. The smart barrier system of claim 1 further comprising a SIM card inserted into the device
a QR code on the device for downloading a program to the mobile phone by reading, wherein the barrier is added to a management system by a device serial number and activation code;

authorized vehicle license plates and alarm policies are programmed over the mobile phone application by the user.

3. The smart barrier system of claim 1 further comprising a smart alarm module wherein the smart alarm is configured to
transmit information and alarms received from a cloud infrastructure to the user,
provide customizable authorization levels for guest vehicles, service vehicles and other authorized vehicles, give a warning to vehicles that stay longer than a pre-defined period and give a warning when more than defined number of vehicles enter, and recording the overtime and extra vehicles;
detect service and guest vehicles entering outside of normal hours,
alarm the user if the read license plate does not match a brand and model of the recorded plate,
alarm the user for twin license plates,
record and warn if there is entrance or exit outside the defined entrance and exit hours of the user to provide information about stolen or unauthorized vehicle use.

4. The smart barrier system according to claim 1 further comprises a reporting module when the smart barrier system is used in housing complexes, wherein the reporting module is configured to
provide information related to a determination of the improvement and requirements of the housing,
report number and type of entering vehicles,
report difference, increment and decrement in numbers with respect to hours, days, weeks and months,
report analytics and tracking of entrance numbers depending on authorization type.

5. The smart barrier system according to claim 1, wherein when the smart barrier system is used in housing complexes, a substructure and software for Housing Complex management system integration
allows a security officer to intervene manually;
logs all operations with user name;
sends physical or software based alarm triggers for a housing camera system; and
allows live video watching and remote record watching.

6. The smart barrier system according to claim 1 wherein the monitoring sensor is positioned on the barrier on posts facing one selected from the group consisting of garage entrance, garage door and vehicle access way, or is positioned on walls around the vehicle access ways.

7. The smart barrier system according to claim 1 wherein the illumination module is integrally located on the system.

8. The smart barrier system according to claim 1 wherein the web page is connected to the server portal application.

9. The smart barrier system according to claim 1 wherein the web page enables authorization operations, an event scenario definition, a log monitoring, a smart alarm and a reporting.

10. The smart barrier system according to claim 1 further comprising a structure that enables associating all barriers belonging to housing complexes to a single housing complex.

11. The smart barrier system according to claim 1 further comprising a structure that allows a user to monitor and manage a plurality of housing complexes over a single center by grouping.

12. The smart barrier system according to claim 1 wherein the face recognition sensor is arranged on the smart barrier system.

13. A method for operating a smart barrier system, comprising:
a license plate recognition system, a face recognition system and a web portal for management, wherein
a license plate recognition operation of the license plate recognition system and a face recognition operation of the face recognition system are performed in a processor module and a barrier is managed by the processor module;
the barrier that enables opening and closing an entrance and exit depends on a trigger received from the processor module, the barrier can also be manually used, and the smart barrier system is installed on the barrier;
a monitoring sensor is configured to broadcast a license plate, a face recognition, a vehicle image, a license plate image and a live video, a resolution and FPS (Frames Per Second) of the monitoring sensor are adjusted depending on a bandwidth and a requirement for providing images to the processor module;
an illumination module is configured to illuminate the vehicle and license plate by using lighting technologies;
a server portal application is configured to provide a web service for a mobile phone application, user data is stored in the server portal application, a cloud smart barrier system in the field is managed in the server portal application, a database is located in the server portal application and an authorization is managed in the server portal application;
the mobile phone application enables user to monitor and manage the smart barrier system;
a communication module is configured to support UTP LAN, WiFi, 3G and 4G communication protocols and send SMS that provides an IP based communication between a device and the server portal application;
a web page enables the user to monitor and manage the smart barrier system,
a face recognition sensor is configured to enable an identification depending on facial characteristics of people;
the method for operating the smart barrier system comprising
keeping one selected from the group consisting of barrier, gate, door closed;
reading a license plate of an incoming vehicle;
commencing the face recognition system (FRS);
checking whether a recognized face is in a first white list and the license plate is in a second white list;
opening the barrier if the license plate is in the second white list,
checking whether the vehicle has completely passed after the barrier is opened;
keeping the barrier open if the vehicle has not completely passed,
closing the barrier if the vehicle has completely passed and getting ready for reading a new vehicle license plate,
if the license plate is not in the second white list, turning on a light, sending SMS, sending an e-mail, giving a vocal alarm and a manual intervention is performed after an approval is received, wherein
if the license plate is not in the second white List, a warning and an image are sent to a mobile phone,
if the approval from the mobile phone is not received; the barrier is kept closed and the license plate is read,
if the approval from the mobile phone is received, the barrier is opened;

opening the barrier and logging on, if the approval is received by the manual intervention, if not approved by manual intervention, keeping the barrier closed, recording the log, photograph, video and data and running a search function.

* * * * *